(12) United States Patent
Cooper

(10) Patent No.: US 8,809,749 B2
(45) Date of Patent: Aug. 19, 2014

(54) APPARATUS AND METHOD OF SMOKING FOODSTUFFS

(76) Inventor: Tom Cooper, Melbourne (AU)

( * ) Notice: Subject to any disclaimer, the term of this patent is extended or adjusted under 35 U.S.C. 154(b) by 501 days.

(21) Appl. No.: 12/451,300

(22) PCT Filed: May 9, 2008

(86) PCT No.: PCT/AU2008/000639
§ 371 (c)(1),
(2), (4) Date: Jun. 24, 2010

(87) PCT Pub. No.: WO2008/138036
PCT Pub. Date: Nov. 20, 2008

(65) Prior Publication Data
US 2010/0264128 A1    Oct. 21, 2010

(30) Foreign Application Priority Data
May 9, 2007  (AU) .................. 2007902467

(51) Int. Cl.
*H05B 3/02*        (2006.01)

(52) U.S. Cl.
USPC .......................................... 219/507

(58) Field of Classification Search
USPC ............ 219/507, 508, 509; 99/327, 331, 332, 99/352, 389, 468, 469, 470, 481
See application file for complete search history.

(56) References Cited

U.S. PATENT DOCUMENTS

| | | | |
|---|---|---|---|
| 3,288,054 A | | 11/1966 | Weprin et al. |
| 3,974,760 A * | | 8/1976 | Ellis .............................. 99/482 |
| 4,126,087 A * | | 11/1978 | McLamb ....................... 99/327 |
| 4,232,597 A | | 11/1980 | Perrine et al. |
| 4,357,522 A * | | 11/1982 | Husslein et al. .............. 219/400 |
| 4,474,107 A * | | 10/1984 | Cothran ......................... 99/352 |
| 4,481,404 A * | | 11/1984 | Thomas et al. ............... 219/398 |
| 4,686,896 A | | 8/1987 | Gordon |
| 4,898,091 A * | | 2/1990 | Rozak et al. .................... 99/336 |
| 4,924,071 A | | 5/1990 | Jacobs |
| 5,485,816 A | | 1/1996 | Cox et al. |
| 5,713,267 A * | | 2/1998 | Wilson ........................... 99/482 |
| 6,810,792 B1 | | 11/2004 | Knight |
| 7,157,668 B2 * | | 1/2007 | Bartelick ....................... 219/393 |
| 7,698,996 B1 * | | 4/2010 | Savchuk ......................... 99/482 |

(Continued)

FOREIGN PATENT DOCUMENTS

| | | |
|---|---|---|
| DE | 10021235 A1 * | 10/2001 |
| EP | 0250385 A | 12/1987 |
| WO | WO 03/055319 A | 7/2003 |

OTHER PUBLICATIONS

Machine translation of German Patent Document DE-10021235, Jun. 2012.*

*Primary Examiner* — Dana Ross
*Assistant Examiner* — Frederick Calvetti
(74) *Attorney, Agent, or Firm* — The Watson I.P. Group, PLC; Jovan N. Jovanovic; Vladan M. Vasiljevic

(57) ABSTRACT

An apparatus is provided for smoking foodstuffs, the apparatus including a plurality of heating elements and a control unit to control operation of the heating elements between an on state and an off state. In use, a material to be burned is associated with each of the plurality of heating elements and the control unit controls the operation of the heating elements such that the heating elements are switched between the off state and the on state.

9 Claims, 4 Drawing Sheets

(56) References Cited

U.S. PATENT DOCUMENTS

| | | | |
|---|---|---|---|
| 2001/0052852 A1* | 12/2001 | Kouznetsov et al. | 340/630 |
| 2006/0060186 A1* | 3/2006 | Cothran | 126/273 R |
| 2006/0137543 A1 | 6/2006 | McLemore et al. | |
| 2007/0028912 A1* | 2/2007 | Gagas et al. | 126/9 R |
| 2009/0078127 A1* | 3/2009 | McLemore et al. | 99/482 |

* cited by examiner

APPARATUS AND METHOD OF SMOKING FOODSTUFFS

FIELD OF THE INVENTION

This invention relates to a smoking apparatus, in particular a smoking apparatus for foodstuffs.

BACKGROUND OF THE INVENTION

Smoked foodstuffs are popular among consumers due to the flavour that smoking imparts to the foodstuff. Smoking of foodstuffs also provides the ability to preserve and/or cook the foodstuff together with imparting flavour.

Foodstuffs are smoked by way of exposing the foodstuff to smoke which is produced by burning a material such as wood. Because the smoking of foodstuffs can take many hours to complete, the material that is burnt to produce the smoke must be repeatedly removed and/or replaced.

There exists smoking apparatus for 'amateur' cooks which include a single heat source that burns material in order to smoke the foodstuff. However, while relatively inexpensive, these apparatus are very labour intensive, requiring regular supervision of the apparatus over a long period of time with the operator removing burnt material and replacing with fresh material to be ignited and burnt by the heat source. These apparatus may not be able to produce product in compliance with modern acknowledged food preparation practices.

There also exists complex automated systems which automatically feed material to be burned in the form of sawdust and then feeds further sawdust as required. Whilst the labour requirement is reduced, these systems are generally large in size, complex and expensive to purchase and maintain.

The above discussion of background art is included to explain the context of the invention. It is not to be taken as an admission that any of the material referred to was published, known or part of the common general knowledge at the priority date of any of the claims of this specification.

SUMMARY OF THE INVENTION

It is desirable to provide a smoking apparatus which is inexpensive, simple to operate and which is automated.

It is also desirable to provide continuous smoking of foodstuffs.

According to a first aspect, the present invention provides a smoking apparatus for smoking foodstuffs including: a plurality of heating elements; a control unit to control operation of the heating elements between an on state and an off state; wherein, in use, a material to be burned is associated with each of the plurality of heating elements and the control unit controls the operation of the heating elements such that the heating elements are switched between the off state and the on state.

Preferably, the control unit further controls the timing of switching the plurality of heating elements between the off state and the on state and the control unit may switch the plurality of units to the on state sequentially.

In one embodiment, the control unit switches the plurality of heating elements between the on state and the off state sequentially such that only one of the plurality of heating elements is in the on state at any time. However, in a preferred embodiment, the control unit switches the plurality of heating elements between the on state and the off state sequentially with an overlap between the off state of a heating element and the on state of the next heating element in the sequence to effectively provide a continuous source of smoke.

The heating elements may be arranged consecutively in one or more rows.

According to a second aspect, the present invention provides a method of smoking foodstuffs including the following steps: controlling operation of a plurality of heating elements between an on state and an off state such that the heating elements are switched between the off state and the on state; and, associating a material to be burned with each of the plurality of hearing elements.

BRIEF DESCRIPTION OF THE DRAWINGS

Specific embodiments of the present invention will now be described, by way of example, with reference to the accompanying drawings, in which.

DETAILED DESCRIPTION OF EMBODIMENTS OF THE INVENTION

Throughout the detailed description and the accompanying drawings, like referenced elements in the Figures refer to like elements in the description.

Figure 1:
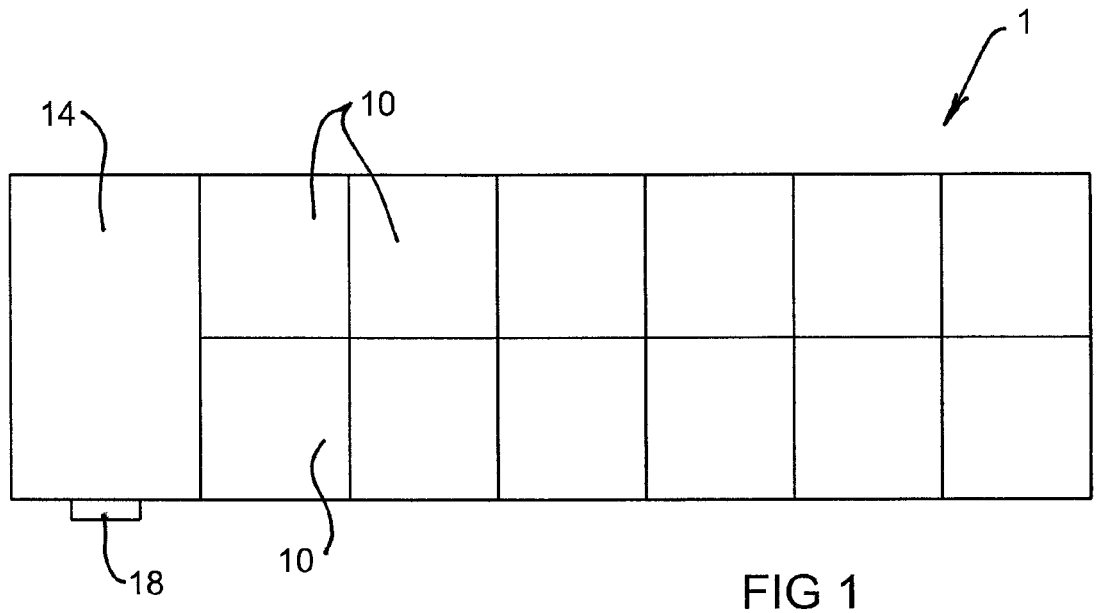
FIG. 1 is a plan view of a smoking apparatus according to a first embodiment of the invention.

A first embodiment of the smoking apparatus according to the present invention is shown in FIG. 1. FIG. 1 illustrates a smoking apparatus 1 including heating elements 10, a control unit 14 and a dial 18 on control unit 14. The smoking apparatus 1 further includes a power supply [not shown] which is used to provide the control unit 14 and heating elements 10 with electrical power. The heating elements 10 are arranged in two rows of six elements each comprising a total of twelve heating elements 10. Any number of heating elements 10 could be used and arranged in any number of configurations. For example, there could be twelve heating elements 10 in a single row only. Alternatively, there could be six heating elements in one row only or formed in two rows of three. Preferably, the heating elements 10 are arranged to reduce the physical dimensions of the smoking apparatus.

Figure 2:
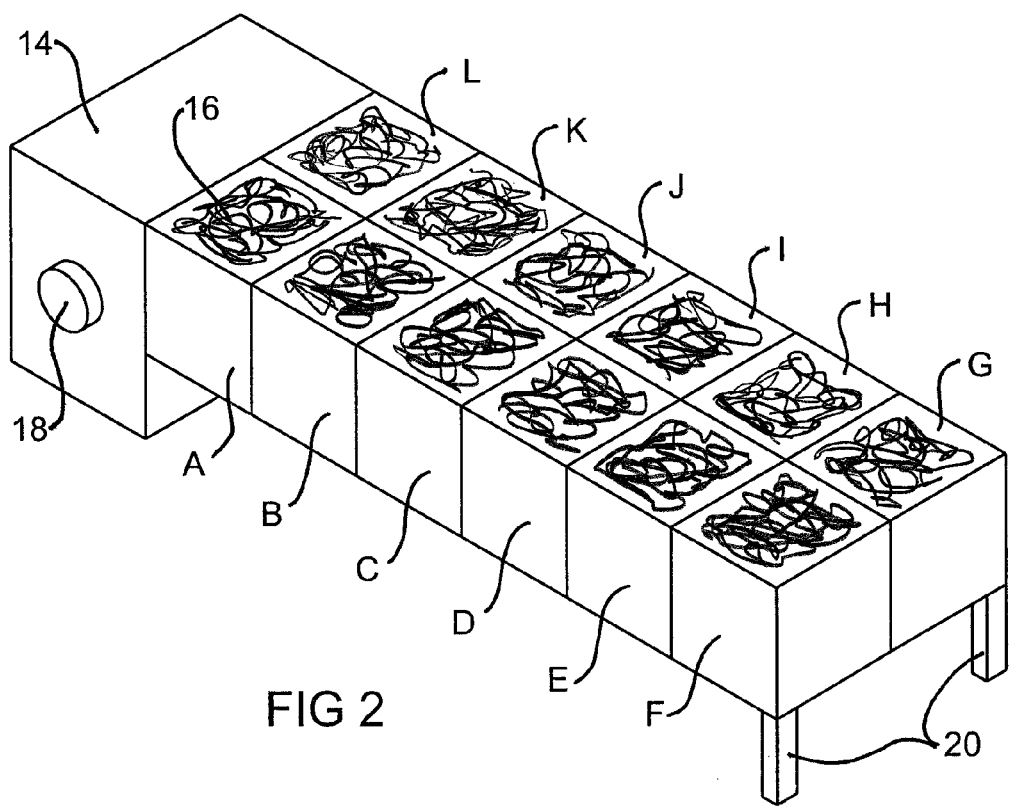
FIG. 2 is a perspective view of the smoking apparatus of FIG. 1 according to a first embodiment of the invention.

FIG. 2 is a perspective view of the smoking apparatus 1 of FIG. 1 and further shows legs 20 which support the smoking apparatus 1 and ensure the heating elements 10 are not in contact with the ground. Also shown in FIG. 2 is material 16 to be burnt by the heating elements 10. The material 16 to be burnt is placed on the surface of each heating element 10. The heating elements 10 are each capable of producing heat so that the material 16 when placed on the heating element 10 will burn and thus generate smoke. The material 16 to be burnt may be sawdust, chips, or manufactured briquettes. The "flavour" imparted to any foodstuff by the smoke will depend upon the material that is burnt, e.g. different types of wood will impart different flavours to foodstuffs when they are burnt/smoked. The heating elements 10 are controlled by the control unit 14 which controls whether the heating element is in the on state or the off state via the dial 18. In the on state the heating elements 10 supply heat to the material 16 which causes it to burn and smoke. In the off state, no heat is supplied to the material 16.

Preferably, the control unit allows an operator to adjust the period of time for which a heating element remains in the on state. This enables an operator to compensate for the different time periods that are required for burning different materials. Many factors affect the rate at which materials burn. In any event, providing a controller that allows the period of time that a heating element is in the on state to be controlled results in each heating element 10 smoking the material 16 for the desired time such that the material 16 is completely burnt and no longer produces smoke. Alternatively, the amount of smoke produced may be considered to be controlled by the dial 18 on the control unit 14 to control how long the heating elements 10 are in the on state. If excess material is placed on each heating element such that it will not be completely burnt for the selected on time, then the controller effectively controls the amount of time for which smoke will be generated. Of course, as a heating element cools after deactivation, smoke will continue to be generated for a short while. Similarly, it will take some time to ignite and burn the material on that particular element. Adjustment of the "time overlap" between activating and deactivating heating elements allows an operator to ensure continuous smoking occurs. The heating elements 10 are preferably electrical heating elements but could also be in the form of a gas burner or any other suitable controllable source of thermal energy.

The operation of the smoking apparatus 1 will now be described with reference to FIG. 2. The operation will be described in the context of cold smoking foodstuffs but it will be appreciated that the smoking apparatus 1 could be used to generate smoke in a heated cabinet, thereby hot smoking foodstuffs. The smoking apparatus 1 includes heating elements 10 which are arranged in two rows of six elements each comprising a total of twelve heating elements 10. This arrangement is advantageous as it allows for the smoking apparatus 1 to be compact in size. The compact size allows the smoking apparatus 1 to be placed in its entirety into a refrigerated unit [not shown] so that the foodstuffs are cold smoked. The cold smoking process typically takes approximately 3 to 6 hours. Preferably, each of the heating elements 10 smokes the material 16 for approximately 30 minutes. Preferably, the number of heating elements 10 allows for the foodstuff to be smoked without the need to replace material 16 to be burnt at any stage during the smoking process. It will be appreciated that in the case of a smaller smoking apparatus 1 including six heating elements 10, the burnt material 16 may be replaced with fresh material 16 and the foodstuff is smoked again as required until it is sufficiently smoked.

Material 16 to be burned is deposited manually onto each of the heating elements 10. One or more foodstuffs [not shown] are placed on a rack in the refrigerated unit. The smoking apparatus 1 is then placed in the refrigerated unit underneath the foodstuffs. The smoking apparatus 1 is then activated by operation of the dial 18 on the control unit 14 and the door on the refrigeration unit [not shown] is closed. The dial 18 may also be used to set the burn time (i.e. the amount of time each of the heating elements 10 is in the on state). Alternatively, the dial 18 may further control simultaneous burning of two heating elements 10 such that there is an overlap time, thus providing a more continuous smoking of the foodstuffs. By default, the burn time is set to 30 minutes for each heating element 10 as this is a suitable setting for cold smoking most foodstuffs.

A further dial may be provided on the control unit 10 to enable the operator to adjust a delay or rest time between the activation of sequential heating elements 10. That is after a heating coil is switched OFF, a 5, 10 or 20 minute delay may be set before the next heating element in the sequence is turned ON.

Figure 3:
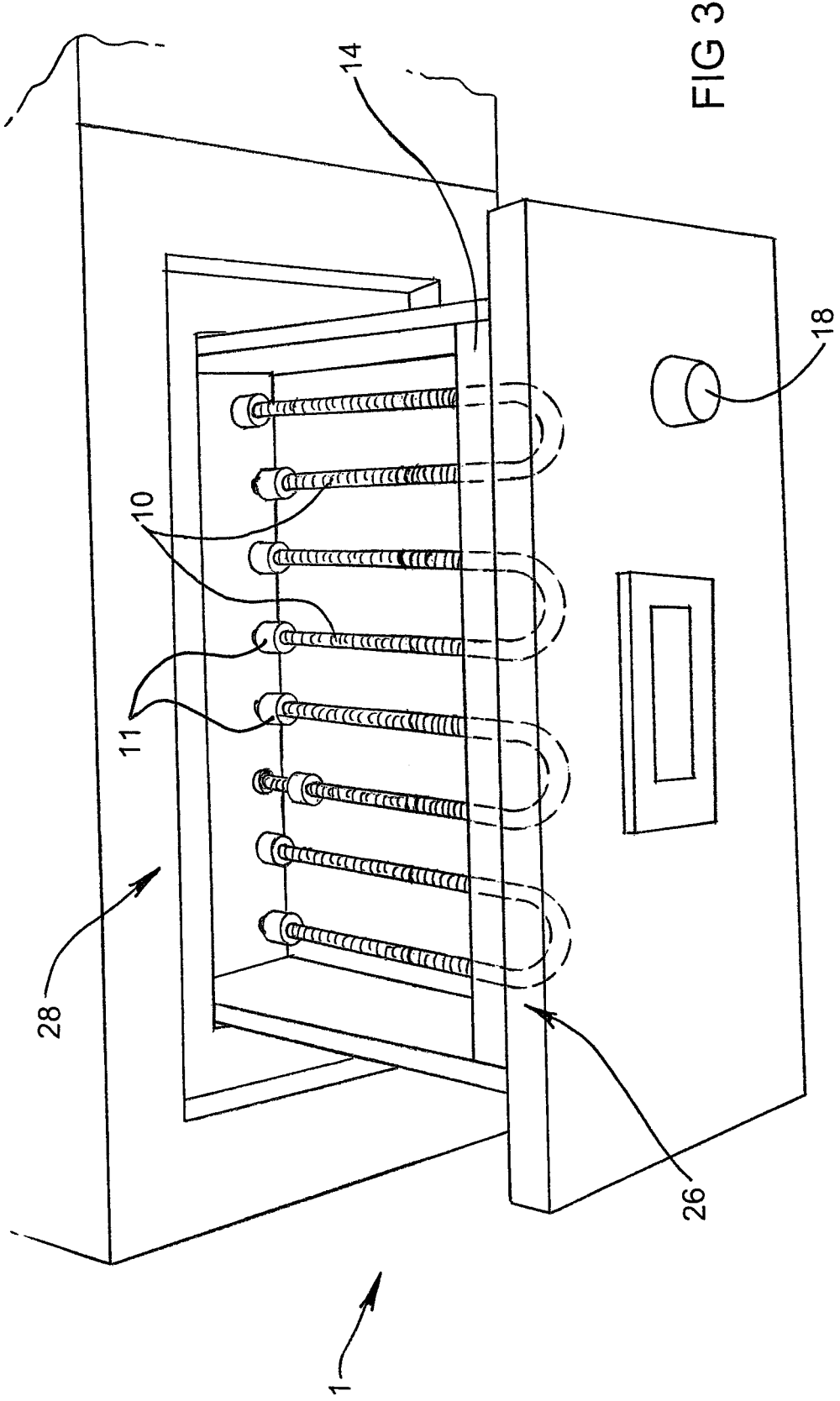
FIG. 3 is a perspective view of a smoking apparatus according to a second embodiment of the invention.
Figure 4:
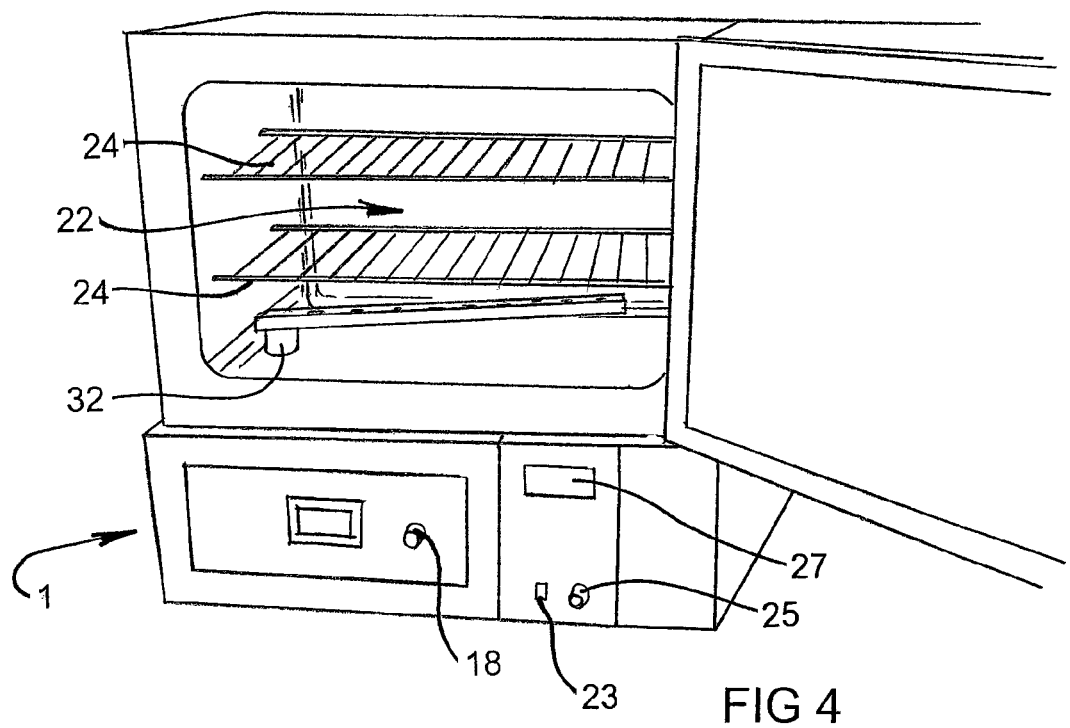
FIG. 4 is a perspective view of the smoking apparatus of FIG. 3 associated with a refrigeration unit.
Figure 5:
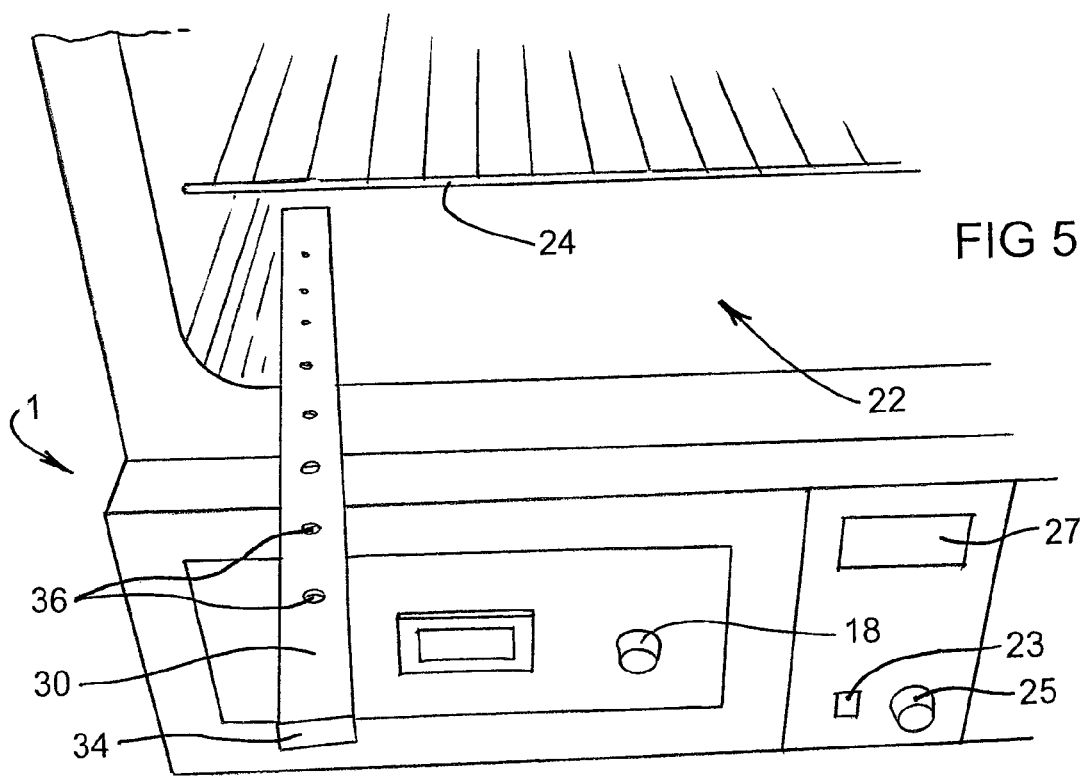
FIG. 5 is a perspective view showing features of the interior of the refrigeration unit of FIG. 4.

A second embodiment of the smoking apparatus according to the present invention is shown in FIGS. 3, 4 and 5. FIG. 3 illustrates a smoking apparatus 1 including heating elements 10, a control unit 14 and a dial 18 on control unit 14 associated with a refrigeration unit 22 (see FIGS. 4 and 5) in which the foodstuffs to be smoked are placed on racks 24. The smoking apparatus 1 includes a power supply [not shown] which provides the control unit 14, heating elements 10 and refrigeration unit 22 with electrical power.

The heating elements 10 within the smoking apparatus 1 are arranged in a single row of four elements each comprising a low voltage coil in the form of a U-shaped loop. However, it is to be understood that any number of heating elements 10 could be used and arranged in any number of configurations. For example, there could be eight bar heating elements arranged in a single row. Alternatively, the heating elements could run across the smoking apparatus 1 rather than from front 26 to back 28. Each heating element may include at least one ceramic insulator 11 or spacer formed from a similarly non conductive material to maintain the heating elements 10 in a substantially horizontal position and prevent the heating elements from coming into contact with the base of the smoking apparatus. The use of the elongate low voltage heating coils enables the physical dimensions of the smoking apparatus 1 to be reduced to a compact unit to fit conveniently beneath a refrigeration unit 22. As shown in FIG. 3, the smoking apparatus 1 may fit within a drawer type structure which is configured to fit directly beneath a refrigeration unit 22.

The smoke produced by burning the material 16 on heating elements enters the refrigeration unit via an inlet 32 that connects the smoking apparatus 1 with the refrigeration unit 22. In one particular embodiment illustrated in FIG. 5, a manifold 30 is mounted over the inlet 32 to facilitate distribution of smoke throughout the refrigeration unit 22. The manifold 30 includes a channel 34 or pipe with a plurality of apertures 36 which increase in size moving away from the inlet 32. The manifold 30 may rotate about the inlet 32 to further facilitate distribution of smoke within the refrigeration unit 22.

The smoking apparatus may be further equipped with a fan [not shown] to assist in blowing the smoke from the smoking apparatus 1 into the refrigeration unit 22. Where a fan is provided, an ON/OFF switch 23 and fan speed adjustment dial 25 are used to control fan operation. A temperature readout 27 for the refrigeration unit 22 may be provided together with means for adjusting the upper and lower temperature limits for the refrigeration unit.

The control unit 14 switches heating element A to the on state for the duration of the burn time. The burn time is either the default (30 minutes) or user set via the setting of the dial 18. This results in heating element A heating up the material 16 which has been placed on heating element A and consequently burning and smoking the material 16 such that the smoke is imparted to the foodstuffs. The smoke produced by burning the material 16 on heating element A is also cooled by the refrigeration unit which prevents the foodstuff from being cooked. Advantageously, this ensures that health regulations are complied with by smoking the foodstuff at a temperature between 0° and 10°. It will be appreciated that in the case of hot smoking foodstuffs, a closed, heated chamber is used rather than a refrigeration unit. Once heating element A has been in the on state for the burn time, the control unit 14 then switches heating element A into the off state and switches heating element B into the on state. Heating element B is also switched to the on state for the burn time and also burns the material 16 on heating element B to further smoke the foodstuffs. The control unit 14 then switches heating element B to the off state once the burn time has elapsed. The control unit 14 then switches heating element C through to heating element L into the on and off states respectively, in sequence. Once heating element L is switched to the off state, the foodstuff has been cold smoked and can be removed from the refrigeration unit. If further smoking of foodstuffs is required, the material 16 is replaced on the heating elements 10. Alternatively, in the case of a smaller smoking unit 1 including less heating elements 10, the burnt material 16 is replaced with fresh material 16 and the smoking process continues as required until the foodstuff is sufficiently smoked.

Figure 6:
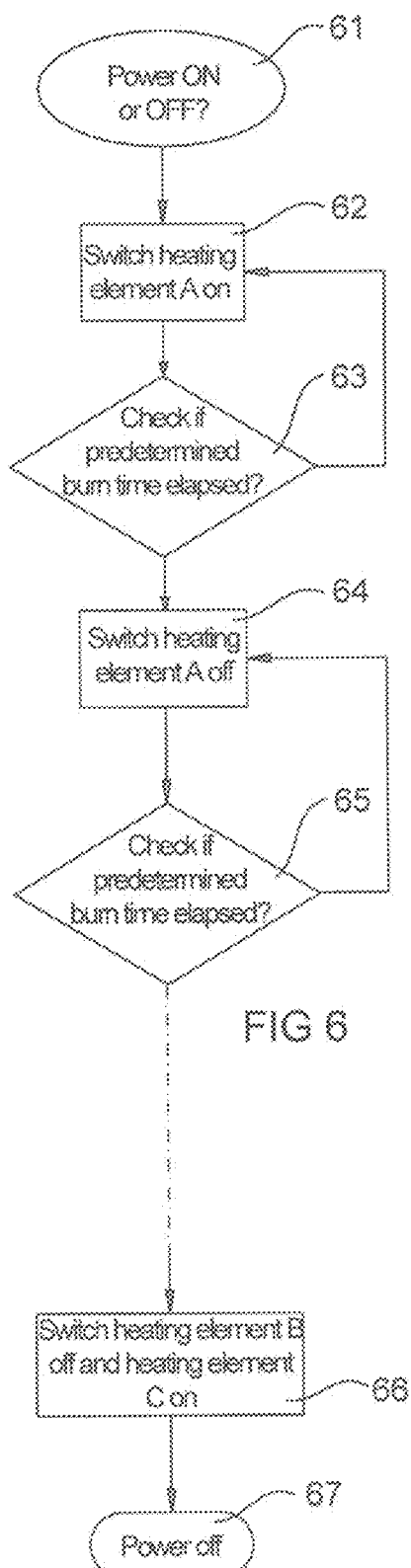
FIG. 6 is a flow chart of the operation of the control unit of the smoking apparatus of FIG. 1 according to an embodiment of the invention.

FIG. 6 shows a flowchart illustrating the control of the smoking apparatus 1 by the control unit 14 in one embodiment. Thus, the invention may be put into effect by the control unit 14 having an electrical circuit that functions in the manner shown. The operation of the control unit will be described with reference to FIGS. 2 and 6.

The routine is entered at step 61 when the power is switched on, e.g. when the dial 18 of FIG. 1 is turned to the on position. The control unit 14 then determines at step 61 whether the power is on. If the answer at step 61 is yes, the control unit 14 then switches heating element A into the on state at step 62. If the answer at step 61 is no then control remains at step 61 until the power is turned on.

The control unit switching the heating element A into the on state at step 62 has the effect of heating and burning material 16 which has been placed on top of heating element A causing the material 16 to smoke and impart flavour to the foodstuff. Control then moves to step 63 and heating element A remains on for the predetermined burn time. The burn time is either a default (e.g. 30 minutes per heating element 10) or is alternatively set by the user via the dial 18. Step 63 continuously checks whether the burn time has elapsed. The control unit 14 remains at step 63 until the burn time has elapsed and control then moves to step 64. Step 64 switches heating element A into the off state and heating element B into the on state. Heating element B then heats and burns material 16 which has been placed on top of heating element B causing the material 16 to smoke and impart further flavour to the food stuff. Control then moves to step 65 and heating element B remains on for the burn time. Step 65 continuously checks whether the burn time has elapsed. The control unit 14 remains at step 65 until the burn time has elapsed and control then moves to step 66. At step 66 heating element B is switched into the off state and heating element C is switched into the on state.

The cycle of steps 62 and 63 are then repeated as required, depending on how many heating elements 10 are included in the smoking apparatus 1. In the case of twelve heating elements 10, the cycle repeats and ends at step 625 where heating element L is switched to the off state and control is returned to step 61.

Figure 7:
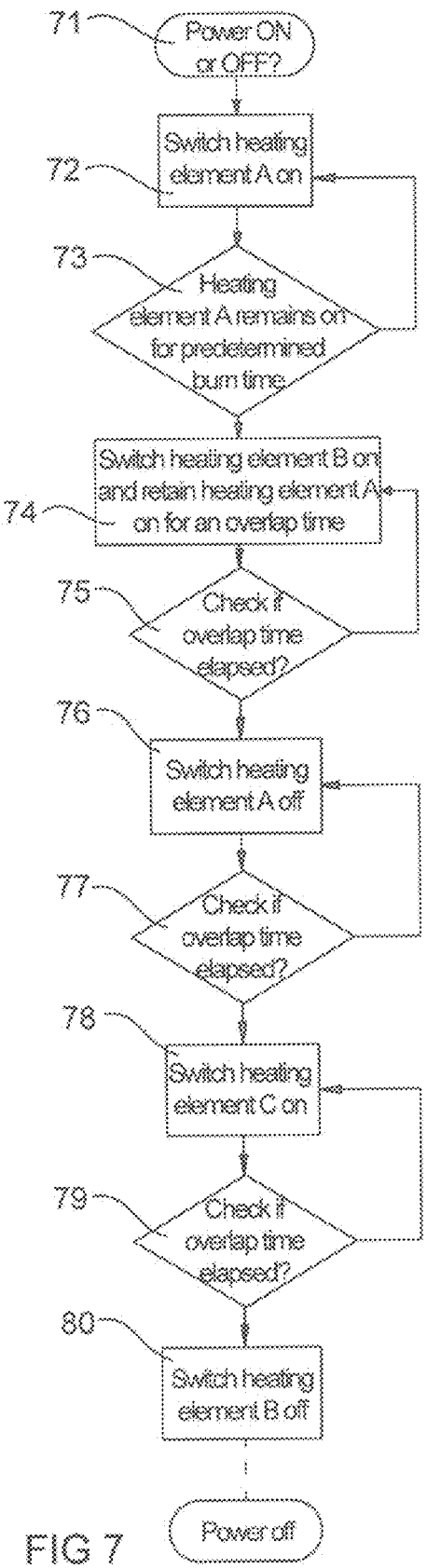
FIG. 7 is a flow chart of the operation of the control unit of the smoking apparatus of FIG. 1 according to another embodiment of the invention.

FIG. 7 shows a flowchart illustrating the control of the smoking apparatus 1 by the control unit 14 in another embodiment. The control unit 14 of FIG. 4 allows for continuous smoking of foodstuffs by sequentially switching each heating element 10 into the on state as described in FIG. 6. However, the control unit additionally provides an overlap between heating elements 10 being in the on state. The overlap allows continuous smoking of the foodstuffs. Generally, the heating elements 10 will take some time to warm up and ignite the material 16 to be smoked. The overlap time allows for one heating element 10 to heat and ignite the material while another is in the final stages of burn time. This results in a more continuous level of smoke produced. Advantageously, a smoking apparatus with twelve heating elements 10 as described allows for completely continuous and automated smoking of foodstuffs without operator intervention.

The routine is entered at step 71 and operates in the same way as described in FIG. 6 above. The control unit switching heating element A into the on state at step 72 has the effect of heating and burning material 16 which has been placed on top of heating element A causing the material 16 to smoke and impart flavour to the food stuff. Control then moves to step 73 and heating element A remains on for the burn time as set by the user by setting the dial 18 or by default (30 minutes). Step 73 continuously checks whether the burn time has elapsed. The control unit 14 remains at step 73 until the burn time has elapsed and control then moves to step 74. Step 74 switches heating element B into the on state and retains heating element A in the on state for an overlap time as determined by the user via dial 18. Step 74 allows for heating element B to be heated and begin to smoke the material 16 while heating element A is nearing completion of its burn time. Both heating elements A and B heat and burn material 16 which has been placed on top of each respective heating element A, B causing the material 16 to smoke and impart flavour to the food stuff. Advantageously, the overlap time ensures that there is consistent smoke produced throughout the smoking process and taken into account the delay time between activating a heating element and ignition and smoking of the material on that element.

Control then moves to step 75 and heating element A remains on for the overlap time. Step 75 continuously checks whether the overlap time of heating element A has elapsed. The control unit 14 remains at step 75 until the overlap time period has elapsed and control then moves to step 76.

At step 76, heating element A is switched to the off state and control moves to step 77. Step 77 continuously checks whether the burn time for heating element B has elapsed. The control unit 14 remains at step 77 until the burn time has elapsed and control then moves to step 78. Step 78 switches heating element C into the on state and retains heating element B in the on state.

Control then moves to step 79 and heating element B remains on for the overlap time as set by the user by setting the dial 18. Step 79 continuously checks whether the overlap time has elapsed. The control unit 14 remains at step 79 until the overlap time has elapsed and control then moves to step 80 at which point heating element B is switched to the off state.

The cycle of steps 72 to 76 are then repeated as required, depending on how many heating elements are included in the smoking apparatus. In the case of twelve heating elements, the cycle repeats and ends when heating element L is switched to the off state and control is returned to step 71.

It will be appreciated by those skilled in the art that the present invention is not limited in scope to the desired embodiment but rather the scope of the present invention is broader so as to encompass other forms of the apparatus.

The invention claimed is:
1. A smoking apparatus for smoking foodstuffs comprising:
a plurality of heating elements, each heating element having a surface upon which a material intended to be burned to generate smoke for smoking foodstuffs may be positioned, each of the heating elements positioned in close proximity to each other and in a side by side orientation;

a control unit to control operation of the heating elements between an on state and an off state, the control unit being structurally configured to control at least two of the plurality of heating elements individually between the on state and the off state, and structurally configured to automatically sequentially activate each one of the at least two of the plurality of heating elements;

wherein, in use, a material to be burned is positioned upon the at least two of the heating elements and the control unit controls the operation of the at least two of the heating elements such that the at least two of the heating elements are switched between the off state and the on state sequentially and automatically by the control unit such that only one of the at least two of the plurality of heating elements is in the on state at any one time, and wherein the plurality of heating elements are located in a first compartment that is physically separate from a second compartment in which the foodstuffs reside during smoking, so that the heating elements are solely for the generation of smoke, the first and second compartments being in fluid communication such that the smoke generated in the first compartment enters the second compartment to impart smoke to said foodstuffs.

2. A smoking apparatus according to claim 1, wherein the plurality of heating elements are arranged consecutively in one or more horizontal rows in substantially the same plane.

3. A smoking apparatus according to claim 1, wherein the second compartment comprises a refrigeration unit having a cavity configured to receive foodstuffs, the refrigeration unit further having an inlet in fluid communication with the plurality of heating elements, such that smoke generated by the material to be burned enters the refrigeration unit through the inlet.

4. A smoking apparatus according to claim 3, wherein the refrigeration unit further includes a plurality of racks upon which to receive foodstuffs.

5. A method of smoking foodstuffs comprising the steps of:
providing a plurality of heating elements in close proximity and in a side by side configuration, each one of the plurality of heating elements having a surface structurally configured to receive a material to be burned;
coupling a controller to each of the plurality of heating elements, the controller structurally configured to control at least two of the plurality of heating elements individually between an on state and an off state, and structurally configured to automatically transition sequentially between each of the at least two of the plurality of heating elements;
positioning a material intended to be burned to generate smoke for smoking foodstuffs onto the surface of the at least two of the plurality of heating elements;
controlling operation of the at least two of the plurality of heating elements having a material intended to be burned positioned thereon between an on state and an off state;
switching a first one of the plurality of heating elements into the on state;
automatically sequentially switching the first one of the plurality of heating elements into the off state while automatically switching the sequentially following one of the plurality of heating elements into the on state so that only one of the at least two of the plurality of heating elements is in the on state at any one time; and allowing each one of the at least two of the plurality of heating elements in the on state to remain in the on state for a predetermined period of time;

generating smoke from each one of the at least two of the plurality of heating elements in the on state by repeating the steps of automatically sequentially switching until a desired number of the at least two of the plurality of heating elements has been in the on state, with that the heating elements positioned solely for the generation of smoke; and positioning a foodstuff to be smoked so as to be in fluid communication with the smoke generated by the material to be burned.

6. The method of claim 5 further comprising the steps of:
providing a refrigeration unit, the unit having an inlet; and
placing the foodstuffs to be smoked within the refrigeration unit;
wherein the plurality of heating elements are provided outside of the refrigeration unit such that the smoke generated by each one of the plurality of heating elements is directed into the refrigeration unit through the inlet.

7. The method of claim 6 further comprising the step of:
providing a manifold in fluid communication with the inlet, the manifold including a plurality of apertures.

8. The method of claim 5 further wherein the step of providing a material to be burned occurs such that the complete material to be burned is provided prior to the step of switching the first of the plurality of heating elements to the on state.

9. A smoking apparatus for smoking foodstuffs comprising:
a plurality of heating elements, each of the plurality of heating elements configured solely for the generation of smoke, and each having a surface upon which a material intended to be burned to generate smoke for smoking foodstuffs may be positioned, each of the plurality heating elements positioned in close proximity to each other and in a side by side orientation;
a control unit to automatically control operation of the heating elements between an on state and an off state, the control unit is structurally configured to control at least two of the plurality of heating elements individually between the on state and the off state, and to automatically sequentially activate each one of the plurality of heating elements;
a refrigeration unit having a cavity configured to receive foodstuffs, the refrigeration unit being physically separate from the plurality of heating elements and further having an inlet in fluid communication with the plurality of heating elements, such that smoke generated by the material to be burned that is positioned on the surface of the at least two of the plurality of heating elements enters the refrigeration unit through the inlet;
wherein, in use, a material to be burned is positioned upon at least two of the plurality of heating elements and the control unit controls the operation of the heating elements such that the heating elements are automatically switched between the off state and the on state sequentially such that only one of the plurality of heating elements is in the on state at any one time.

* * * * *